United States Patent [19]
Taylor

[11] 3,860,263
[45] Jan. 14, 1975

[54] UNIVERSAL TIEDOWN DEVICE

[76] Inventor: Glenn E. Taylor, 1345 Bankhead Ave., Atlanta, Ga. 30318

[22] Filed: June 27, 1973

[21] Appl. No.: 374,104

[52] U.S. Cl. ...... 280/179 R, 105/368 T, 248/361 R
[51] Int. Cl. ............................................. B60p 7/08
[58] Field of Search .................. 280/179 R, 179 A; 105/268 R, 368 T; 248/361 A, 361 R

[56] References Cited
UNITED STATES PATENTS

| | | | |
|---|---|---|---|
| 2,322,576 | 6/1943 | Huebshman et al. | 248/361 X |
| 3,181,886 | 5/1965 | Blunden et al. | 280/179 R |
| 3,520,555 | 7/1970 | Blair | 280/179 A |

Primary Examiner—David Schonberg
Assistant Examiner—Michael J. Forman
Attorney, Agent, or Firm—Watson, Cole, Grindle & Watson

[57] ABSTRACT

A universal equipment tiedown device for securing equipment in fixed position on a vehicle transport, having a generally horizontal vehicle supporting track, there being associated with each track a windlass, having a rotatable windlass drum and a flexible tension element operatively connected to said drum, together with means for rotating the drum to wind the tension element there around. The block having a sheave rotatable therein is connected to the track by a flexible tether chain and the track is provided with key hole slots or other means adapting it for selective connection to the tether chain at any of a plurality of horizontally spaced locations on the track.

8 Claims, 5 Drawing Figures

3,860,263

UNIVERSAL TIEDOWN DEVICE

This invention relates to a universal tiedown device used to tie down or secure equipment, such as automotive vehicles, while being transported aboard a carrier or other transporting type vehicle.

Tie down devices in present day use are such that multiple ratchet type installations are required per wheel to satisfy the requirements to safely secure all of the many types, sizes and shapes of automobiles manufactured throughout the world.

A disadvantage of such multiple ratchet arrangement is that it is time consuming. For instance: (a) the chain must be relocated to the nearest or most convenient ratchet bar, (b) then hooked to the ratchet bar and (c) laborously tightened. When the vehicle is unloaded there remains the problem of chain storage. Even when using a storage box many chains are still lost over a period of time. In addition, all such prior tiedown installations add much weight to the transporting vehicle which could be well used to increase the pay-load. A further disadvantage is that the hauler is faced with an extensive modification program every time the automobile manufacturer changes his product, especially if the locations of the tiedown holes in the frame of the automobile are changed.

It is therefore a primary object of this invention to provide a tiedown which is extremely versatile so as to be capable of substantially universal usage in securing automotive type vehicles or other equipment to their respective transporters, regardless of their size, shape or location of their tie down points, and which embodies a minimum amount of weight, thus providing a maximum payload available for revenue production, because of the fact that only one tie down will be required per wheel of the vehicle to be tied down.

It is further object to provide a tiedown which is self storing, which has substantial noise dampening qualities when the transport is travelling empty or with only partial load, and in which there are no loose chains to be lost and/or litter the highways.

Additional objects, features and advantages will become apparent from the following detailed description, in conjunction with the accompanying drawings, in which:

FIG. 1 is a perspective view of the front end portion of an automobile supported on the tracks of a conventional automobile transport, and illustrating in full lines how the tie down device of the invention is employed for securing the automobile to the track; and in broken lines how the same device is employed for securing the automobile in the event the location of its tie down holes are changed;

DETAILED DESCRIPTION OF THE PREFERRED EMBODIMENT

Figure 1:
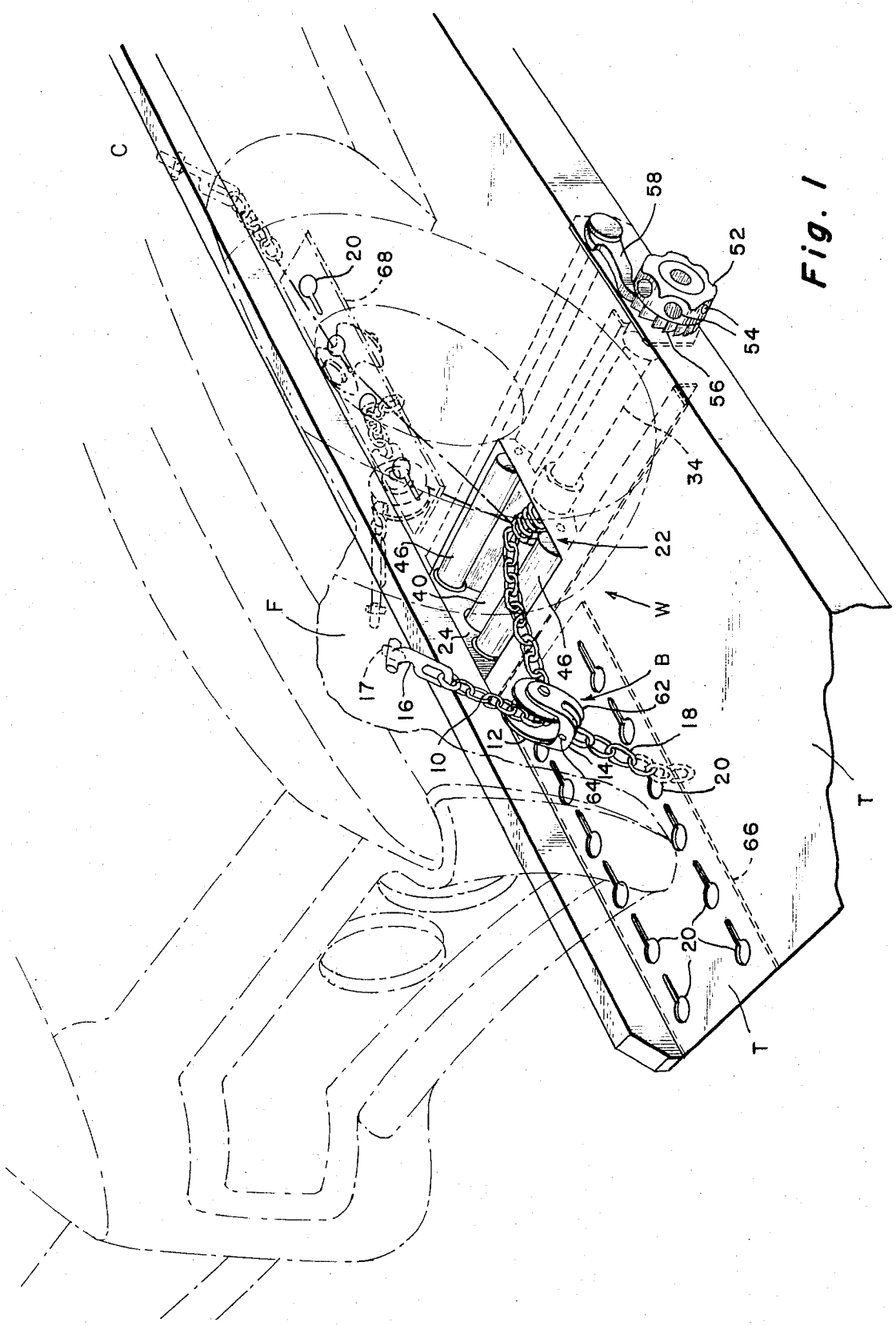

Referring first generally to the structure shown in FIG. 1 of the accompanying drawings, the letter W therein designates in its entirety a suitable windlass which is supported on the track T of a conventional automobile carrier for transport. The flexible tension element 10 of the windlass, herein illustrated in the form of a conventional tie down chain, extends from the windlass and around the sheave 12 of a generally conventional block 14 to form therewith a block and tackle unit B, the free end of the chain being defined by suitable hook, exemplified in FIG. 1 as a generally conventional tee hook 16 having its cross bar adapted for operative reception in a tie down hole at a suitable location in the frame of a conventional automobile supported on the carrier track T. The hook 16 thus exemplifies means for connecting the free end of the element 10 to the equipment to be tied down.

It will be seen that the block 14 is tethered to the carrier track T by a suitable anchor chain or tether chain 18 connected to the block and adapted for operative disposition in any of the various key hole slots 20 which are preferably distributed in several suitably located series with respect to the track T.

It will be apparent that the windlass W may be actuated to draw the tie down chain 10 through the block B, thus to exert tension through the chain for drawing the automobile frame downwardly toward the track T, and maintaining the automobile firmly in position during transport by the carrier, of which the track T constitutes a part.

It will be understood that in accordance with usual practice, the carrier will include two relatively spaced parallel tracks such as T, arranged symmetrically to support the two pairs of wheels on opposite sides of the automobile, though only a single track and a single automobile wheel are herein illustrated. Furthermore, it will be appreciated that each tie down device, such as herein disclosed, will normally be located generally in a location adjacent to the respective vehicle wheels for connection to suitable tiedown means, customarily located on the vehicle chassis adjacent to the respective wheels, and generally assuming the forms of holes or appertures 17 for reception of the hooks 16 at the free ends of the tie down chains.

Figure 2:
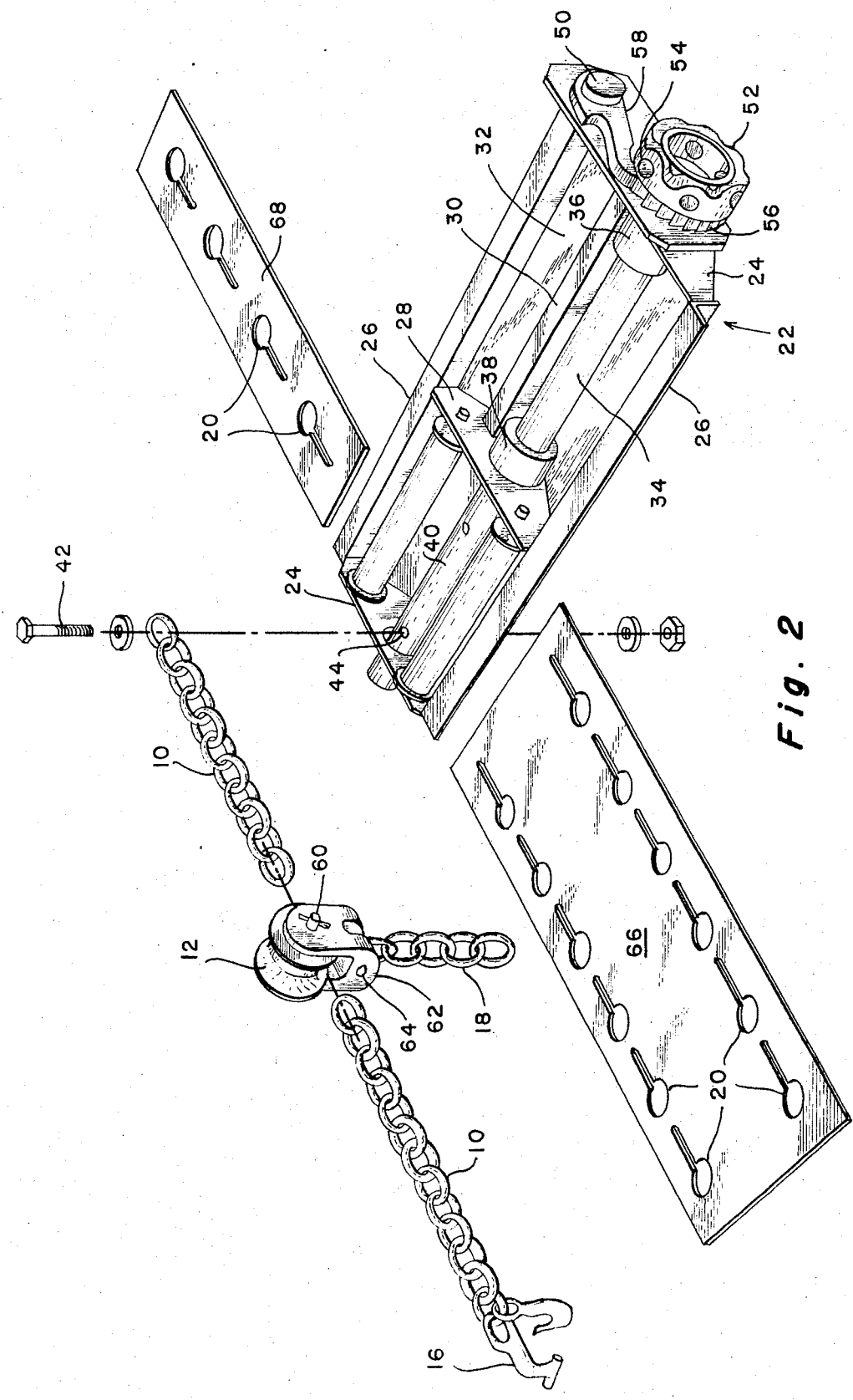
FIG. 2 is an exploded or disassembled perspective view of one of the tie down devices.
Figure 3:
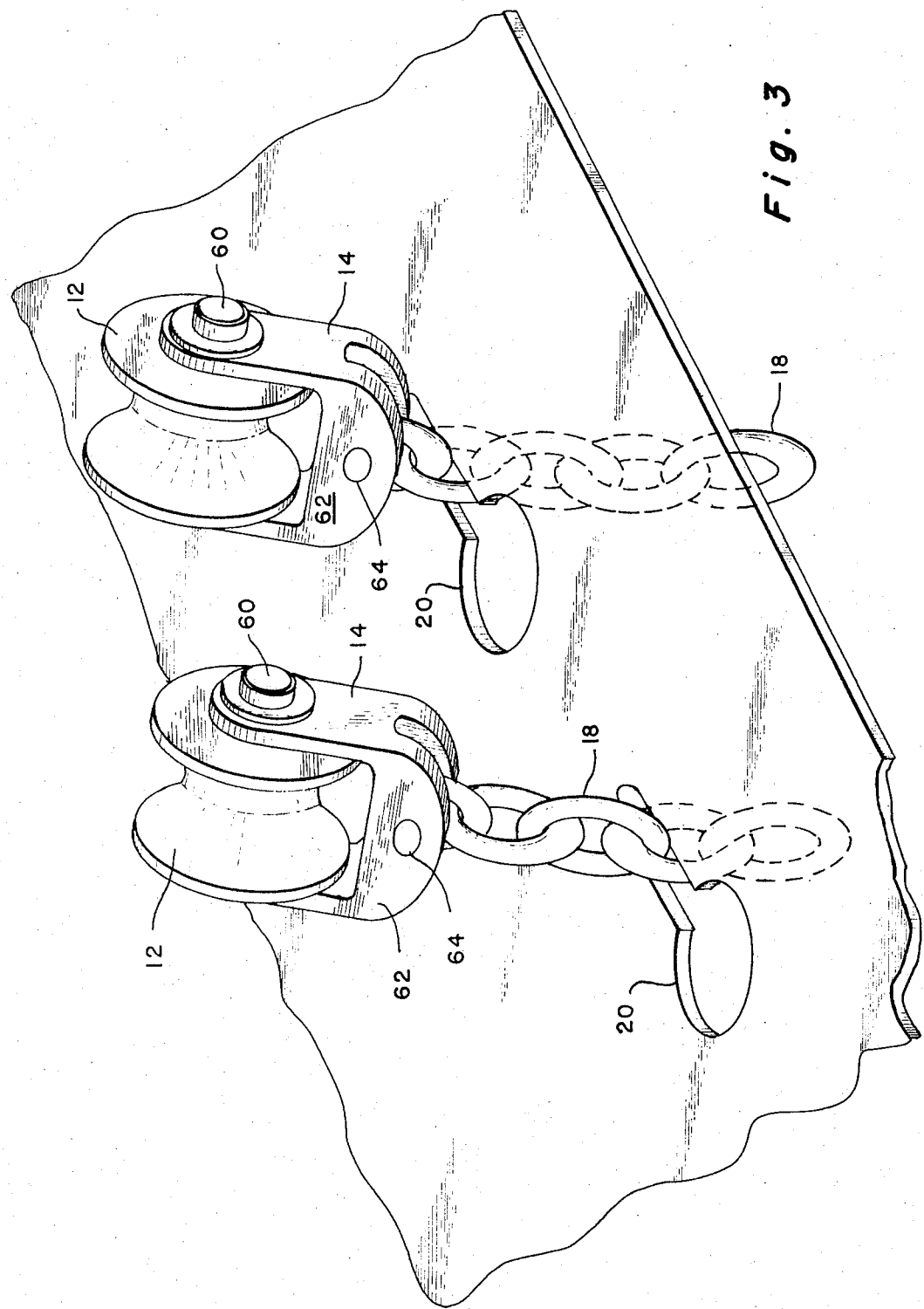
FIG. 3 is an enlarged perspective view illustrating the manner in which the pulley blocks may be adjustably tethered or anchored at varying distances from the transport tracks, while being free to swivel.

Referring now in somewhat more detail to the apparatus illustrated in FIGS. 1 and 2 of the drawings, the windlass W in the illustrated embodiment is supported by a rigid frame 22, best illustrated in FIG. 2, and comprising rigid end plates 24—24 interconnected by sides in the form of angle iron 26—26. Also supported by the angle irons between the end plates is a bracket 28. Preferably the angle irons 26, plates 24 and bracket 28 are rigidly interconnected, as by welding or in other suitable manner. In order to achieve rigidity of the frame structure, one end plate 24 and bracket 28 are further interconnected by an angle iron brace 30 extending horizontally between them in a plane below the horizontal plane of the side angle irons.

The entire structure may be further rigidified by a sheet metal bottom 32 which extends between and is connected with the sides and ends of the frame and which cooperates therewith to define an upwardly opening rectangular box, at least a portion of which is adapted for reception and storage of the tie down chain 10, when the latter is not in use.

The windlass shaft 34 is rotatably supported in bearings 36, 38 carried by the end plate 24 and the bracket 28. The bearings preferably including suitable plastic material or Teflon bushings offering minimum frictional resistance to rotation of the shaft.

The windlass drum 40 around which the chain 10 is wound, constitutes an extension of the windlass shaft 34. As will be apparent from FIG. 2, one end of the tie down chain 10 is connected fixedly to the drum as by means of a bolt 42 extending through an end link of the chain and through a diametrical bore 44 in the drum.

It is to be noted that the entire windlass, including its frame and the chain storage box 32 are disposed beneath the horizontal surface of the track, the track T being provided with a suitable rectangular opening in registry with the chain storage box through which the chain may be wound on to and from the drum.

In order to guide the chain 10 clear of the track T, it is desirable to provide near opposite sides of the drum, a pair of guide rollers 46—46 the shafts 48 of which are rotably supported through openings in the medial bracket 28 and end plate 24.

It will be noted that the right hand end of the windlass shaft 34, as seen in FIG. 1, projects through and beyond the downwardly turned side flange of the track T and through a reinforcing plate or bracket 50 affixed to the end plate 24. Rotation of the windless drum 40 for the purpose of tensioning the tie down chain 10, is produced in the present embodiment through a drive wheel 52 affixed to the projecting end of the windlass shaft 34 and provided with one or more radial sockets 54 adapted for reception of the end of an operating lever or hand spike which may be removed from and replaced in the sockets in obvious manner to rotate the shaft and drum and which may be completely disassembled from the drive wheel during transport.

For maintaining the drum against reverse rotation, once it has been rotated to draw the tie down chain taut, there is provided a conventional rachet wheel 56 which is affixed to the windlass shaft and which cooperates in a known manner with a conventional pawl 58 connected to the reinforcing plate or bracket 50 at a location such as to be urged by gravity into operative engagement with the ratchet wheel, but being capable of manual retraction when the shaft 10 is partially rotated sufficiently to free the operative end of the pawl from locking engagement with the rachet wheel, all as is well known in the art.

The block 14 may be of any generally conventional construction, though in order best to adapt it for use in the present invention, it is illustrated as comprising a generally U-shaped shell or yoke in which the grooved sheave 12 is rotatably supported by a pin 60 extending transversly between the legs or cheeks of the shell. The bridging portion of the shell between its cheeks is formed to define a clevis 62 to which the end link of the tether or anchor chain 18 is secured by means of the cross pin 64.

The free end portion of the tether chain 18 is adapted for selective reception in any of plurality of suitably located key hole slots 20. It will be readily seen that any desired portion of the length of the tether chain 18 may be inserted through the enlarged end of a selected slot 20 whereupon a link of the chain can be moved into the narrow portion of the slot, so that its withdrawal will be prevented by a relatively transversely extending link immediately there below.

The slots 20 are preferably provided in several different series, each consisting of a multiplicity of slots, at suitable locations relative to the track T.

The said slots 20 as illustrated in FIGS. 1 and 2, extend through the horizontal portion of the track T adjacent to the inner wall thereof, and preferably through tie down plates 66 and 68 which are rigidly secured to the under side of the track and which serve to reinforce the latter against the stresses transmitted through the tether chains 18.

Mode of Operation

As has above been mentioned, the tie down devices of the invention will preferably be located along each of the tracks T of the automobile carrier or transport, at locations such that one of such devices will be normally located conveniently accessible to each of the four wheels of automobile when finally positioned on the tracks.

As soon as the automobile has been placed at the desired station on the tracks, the tie down device which is located most nearly in proximity to a respective one of the automobile wheels is applied or connected to the vehicle in the manner exemplified in FIG. 1 of the drawings.

To this end, the block 14 and its associated chains 10,18 of a given device, (and which normally will have been stored in the chain box 32,) will be removed from the box. The free end of the tie-down chain 10 will be unwound in obvious manner from the windlass drum, the rachet 56 being manualy released, if necessary, to permit the desired degree of unwinding, following which the hook 16 at the free end of tie down chain wil be operatively connected to the automobile. The tether chain or anchor chain 18 will then be inserted downwardly through the enlarged end of a suitably located key hole slot 20 and drawn therethrough to the desired extent to position the block 14 at a desired level above the horizontal surface of the track.

In the full line position of the block and its associated chains, in FIG. 1, as designated by the letter A it will be noted that the automobile is so positioned that the tie down hole 17 in the illustrated portion of its frame is located somewhat forwardly of the winch drum 40, and the device is applied and positioned in such a manner as to cause the tie down chain 10 to exert a forward and downward tension on the automobile. To this end, the tether chain 18 is inserted through a selected key hole slot 20 located near the middle of its longitudinal series of slots, and at a location forwardly (with respect to the direction in which the automobile is heading) of the tie down hole. The tether chain is drawn through the selected slot 20 to position the block well below the tie down hole or point of attachment 17 of the tie down chain to the vehicle. In this illustrated embodiment, the vehicle is one which is of standard width so that the longitudinal series of key slots in plate 66 are appropriate.

In the event the vehicle chassis is of narrower width, as for instance in a compact automobile, either of the series of slots shown in FIG. 1 and located adjacent to the inner edge of the track T may be suitably employed. In such event, assuming that the tie down hole 17 in the vehicle is at the location designated by the letter B in FIG. 1, the block may then be tethered to the track by insertion through a selected key hole slot in the series formed through plate 68 and here shown at a location rearwardly of the point of attachment B, and substantially below that point so as to exert a rearward and downward tension on the automobile. In this event, the tie down device to be associated with the rear end of the car will normally be disposed to exert a rearward and forward pull or tension.

Again, assuming that the automobile is one having a comparatively narrow width, and having its attachment point or tie down hole located at C in FIG. 1, then the device may be associated with the vehicle in the alternative manner indicated in broken lines at the location C in FIG. 1. In this it will be noted that the tie down hole 17 and thus the point of attachment of the vehicle is located well rearwardly of the windlass drum 40 and the block 14 in this case is accordingly located below and forwardly of the tie down hole so as to exert a forward and downward pull on the chassis it being understod that in accordance with the usual practice the tie down device is at the rear of the chassis will be disposed to exert downward and rearward pulls in opposition thereto.

Figure 4:
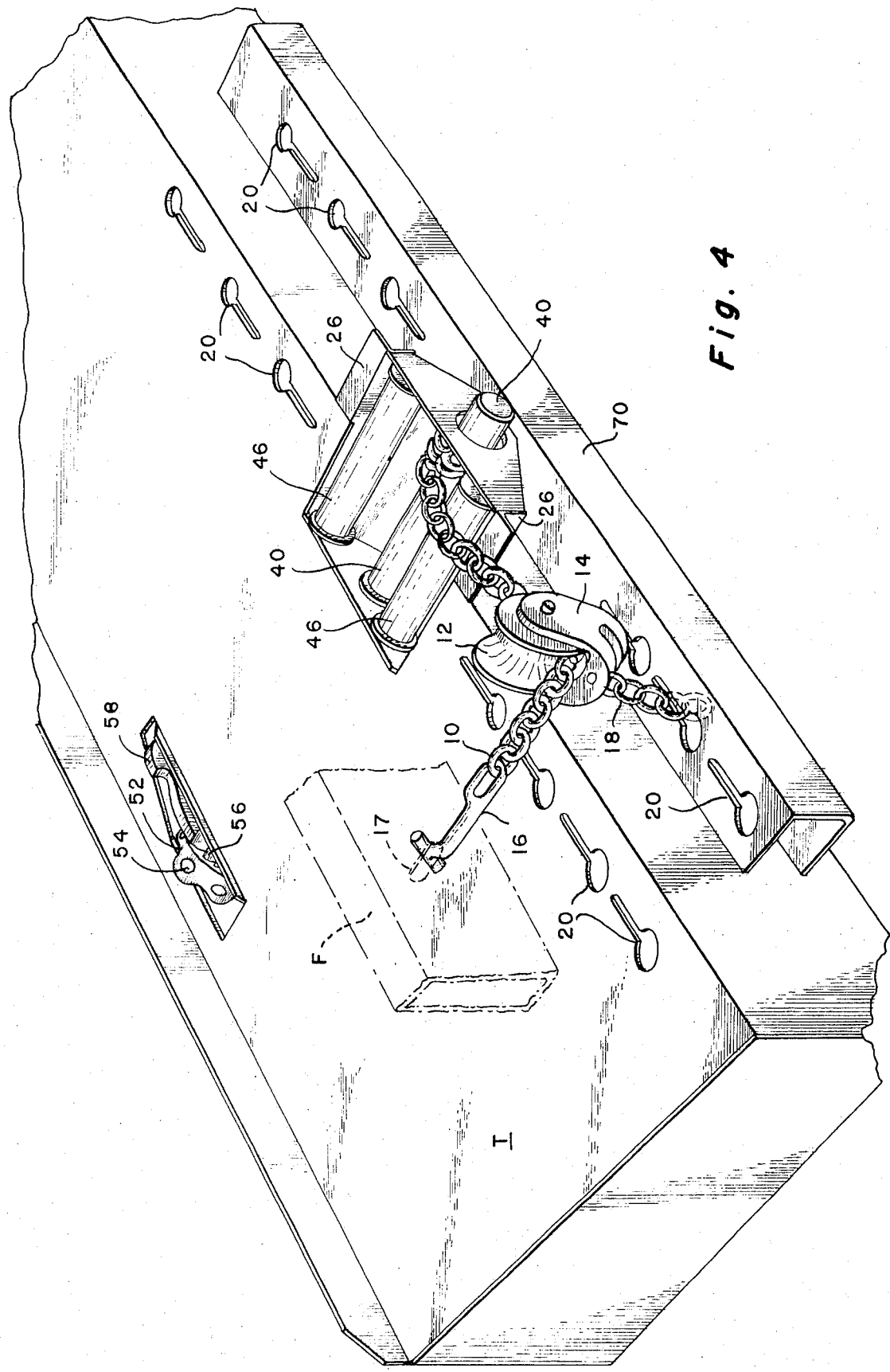
FIG 4 is a perspective view of a somewhat modified arrangement of the tie-down device; and, FIG. 5 is a generally diagrammatic view of a portion of the structure shown in FIG. 1, as seen from approximately the mid-section of the track.

In FIG. 4 of the accompanying drawings, the construction and arrangement is similar to that hereinbefore disclosed and the corresponding parts are designated by similar reference characters, except that in this instance the tie down device is adapted for use with automobiles of unusually narrow width. To this end, the track has firmly affixed thereto, as be welding to its inner vertical wall a horizontal extension, here exemplified by a suitable channel iron 70, the upper horizontal web of which is provided with two aligned series of key hole slots 20 for cooperation with the tether chain 18 in the manner hereinbefore described.

Because of the ability of the tether chain 18 to twist freely about its longitudinal axis, at least to a limited extent, it will be apparent that the chain 18 in each of the embodiments permits or provides a substantially universal swivel action for the block 14 about the longitudinal axis of the chain. Moreover the chain 18 is free for swinging in any direction about the point of reception in its associated key hole slot 20. Because of this, the block, including the sheave 12 associated therewith, is in effect capable of self alignment with the point on the transported vehicle at which the hook 16 is engaged, and regardless of where this point may be located with relation to the track, thus providing a wide angle of side adjustment for the tie down. This is extremely important in achieving maximum adjustability of the tie down system.

Figure 5:
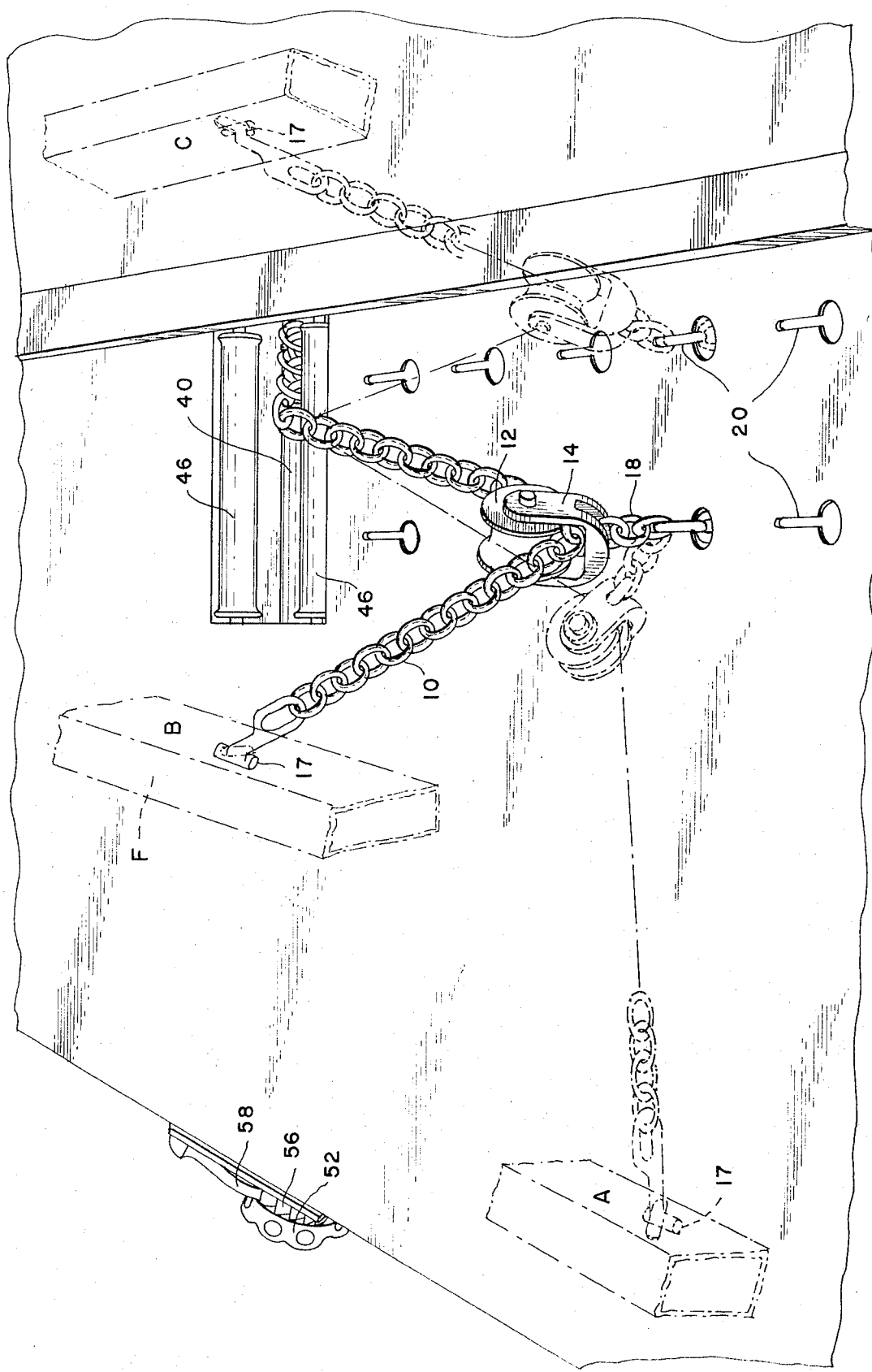

As more fully illustrated in FIG. 5, the tie down slot or opening in the transported vehicle frame can be located at any point between the locations A and C with relation to the width of the track, and nevertheless, due to the universal swivel action provided by the tether chain, the sheave 12 will be substantially self aligning with respect to the line of pull on the tie down chain 10. This action is of course made possible to a large extent because of the ease with which the key hole slots 20 may be located at any various desired locations on the track lengthwise and crosswise thereof, to increase the overall versatility of the system.

In accordance with the invention it will be apparent that any vehicle or automobile regardless of size, shape or tie down hole location, can be tied down and secured properly and safely using only one tie down device per wheel.

The embodiments of the invention in which an exclusive property or privilege is claimed are defined as follows:

1. A universal equipment tie down device for securing equipment in fixed position on a vehicle transport, having a generally horizontal vehicle supporting track, comprising in connection with each track, a rigid frame secured to the under side of said track beneath an opening in said track, a windlass, including a rotatable windlass drum mounted for rotation in said frame beneath said opening, a flexible tension element operatively connected to said drum and extending through said opening, and means for rotating the drum to wind said tension element therearound, a block and tackle means, including a block above the level of said track, having a sheave rotatable therein, said tension element extending around said sheave and having a free end, with means at said free end for connection to the equipment to be tied down, a flexible tether chain connecting said block to said track, and means adapting said track for selective connection to said tether chain at any of a plurality of horizontally spaced locations relative to said track.

2. The combination of claim 1 in which said last mentioned means comprises means defining a plurality of key hole slots at various relatively horizontally spaced locations, each said slot being adapted for locking reception and engagement with a pre-selected link of said tether chain at a fixed location along the length of said chain in a manner to prevent relative longititudinal movement of the chain through said slot, while permitting relative universal angular movement of the chain with respect to said track at the point of connection between said tether chain and the track.

3. The universal equipment tiedown device as defined in claim 2, the tether chain having a plurality of chain links any selected one of which is adapted for locking reception in any one of said key hole slots at a pre-selected distance from said block, whereby said block is universally swingable about its point of connection to said track, at a pre-determined radius.

4. The combination defined in claim 1, wherein said block comprises means for supporting it at a pre-determined distance from a pre-selected horizontal location along the said track and for substantially universal angular movement with respect to said location.

5. The combination of claim 1, including guide rollers rotatably journalled across said opening on opposite sides of said drum.

6. The combination of claim 1, including a box member supported from said frame beneath said opening to provide storage for said tension element during periods of non-use.

7. The combination of claim 6, including a radially socketed drive wheel connected to said drum to rotate the latter.

8. The combination of claim 7, including a ratchet wheel affixed to said drum for rotation therewith, and a holding pawl pivotally connected to said frame for preventing reverse rotation of the drum.

* * * * *